US008724760B2

(12) United States Patent
Grobert et al.

(10) Patent No.: US 8,724,760 B2
(45) Date of Patent: *May 13, 2014

(54) GPS AIDED OPEN LOOP COHERENT TIMING

(75) Inventors: Paul H. Grobert, Granada Hills, CA (US); William K. Wallace, Rancho Palos Verdes, CA (US)

(73) Assignee: Raytheon Company, Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/458,543

(22) Filed: Apr. 27, 2012

(65) Prior Publication Data

US 2013/0287067 A1    Oct. 31, 2013

(51) Int. Cl.
*H04L 7/00*    (2006.01)
*H04B 17/02*    (2006.01)
(52) U.S. Cl.
USPC ........................................... 375/356; 375/213
(58) Field of Classification Search
USPC .................................................. 375/356, 354
See application file for complete search history.

(56) References Cited

U.S. PATENT DOCUMENTS

| | | | |
|---|---|---|---|
| 4,734,702 A | 3/1988 | Kaplan | |
| 5,822,429 A | 10/1998 | Casabona et al. | |
| 5,944,770 A | 8/1999 | Enge et al. | |
| 6,388,611 B1 | 5/2002 | Dillman | |
| 6,449,558 B1 | 9/2002 | Small | |
| 2008/0062039 A1 | 3/2008 | Cohen et al. | |
| 2009/0061759 A1 | 3/2009 | Stoddard et al. | |
| 2010/0007554 A1 | 1/2010 | Wang et al. | |
| 2011/0275308 A1* | 11/2011 | Grobert et al. | 455/1 |

OTHER PUBLICATIONS

Tang, et al., *A Kinematic Carrier Phase Tracking System for High Precision Trajectory Determination*, Preprint ION GPS-94, Salt Lake City, Utah, 1994 (7 pgs.).
Dai, et al., *Innovative Algorithms to Improve Long Range RTK Reliability and Availability*, ION NTM 2007, Jan. 22-24, 2007, San Diego, CA, pp. 860-872.
Attachment 1, Program Description, BAA 09-01-PKS, Call 34, *Multi-INT Reference Optimzation for Distributed Sensing (MIRODS)*, prior to Nov. 15, 2010 (4 pgs.).
Extended European Search Report for European Application No. 11250249.7, Extended European Search Report dated Sep. 13, 2011 and mailed Sep. 20, 2011 (5 pgs.).

(Continued)

*Primary Examiner* — Chieh M Fan
*Assistant Examiner* — Brian J Stevens
(74) *Attorney, Agent, or Firm* — Christie, Parker & Hale, LLP

(57) ABSTRACT

GPS aided precision timing uses GPS to generate synchronized timing pulses by various nodes. One of the nodes is designated as a master node and the remaining nodes are designated as auxiliary nodes. Each node tracks the carrier phases of satellite signals transmitted by a plurality of GPS satellites relative to a carrier phase of a reference oscillator in the respective node. The master node provides the tracked phase measurements along with its position information to all of the auxiliary nodes. Each auxiliary node determines the phase offset of its reference oscillator relative to the reference oscillator of the master node to "align" its phase to the phase of the master node. The phase of a time pulse signal generator in each node is then aligned to the phase of its reference oscillator for generating synchronized timing pulses based on the aligned phases.

14 Claims, 8 Drawing Sheets

(56) References Cited

OTHER PUBLICATIONS

Written Opinion of the International Searching Authority for International Application No. PCT/US2013/027186, filed Feb. 21, 2013, Written Opinion of the International Searching Authority mailed May 31, 2013 (5 pgs.).

International Search Report for International Application No. PCT/US2013/027186, filed Feb. 21, 2013, International Search Report dated May 22, 2013 and mailed May 31, 2013 (3 pgs.).

* cited by examiner

GPS AIDED OPEN LOOP COHERENT TIMING

FIELD OF THE INVENTION

This invention relates generally to providing precise time coherency, and more particularly, to a system and method for using GPS to implement such precise time coherency.

CROSS-REFERENCE TO RELATED APPLICATIONS

This application is related to U.S. application Ser. No. 12/777,215, filed on May 10, 2010, the content of which is incorporated herein by reference.

BACKGROUND OF THE INVENTION

It is desirable to be able to generate picosecond accurate relative timing pulses between nodes such as, for example, between land or airborne vehicles, ground stations, and/or satellites. Traditional mechanisms for providing such picosecond accurate relative timing pulses involve the use of atomic clocks which tend to drift apart over time. Due to this drifting, atomic clocks must generally be brought together periodically for resynchronization.

It is desirable to provide picosecond relative timing accuracy between nodes without the use of precise atomic clocks.

SUMMARY OF THE INVENTION

According to one embodiment, the present invention is directed to a method for generating synchronized timing pulses from a plurality of nodes. One of the nodes is designated as a master node and the remaining nodes are designated as auxiliary nodes. Each of the nodes includes a GPS receiver, reference oscillator, frequency synthesizer, and signal transmitter. The GPS receiver in each of the plurality of nodes measures carrier phases of satellite signals transmitted by a plurality of GPS satellites relative to a carrier phase of the reference oscillator in the respective node. The master node provides to the auxiliary nodes, data relating to the measured carrier phases of the plurality of GPS satellites and position information of the master node. Each of the auxiliary nodes determines, based on the data from the master node, a difference of the phase of the reference oscillator of the auxiliary node relative to the phase of the reference oscillator in the master node. A carrier phase of a signal generated by the time pulse signal generator in each auxiliary node is aligned based on the determined phase difference. Each of the auxiliary nodes generates a timing pulse based on the aligned carrier phase.

According to another embodiment, the present invention is directed to a communications node for generating synchronized timing pulses. The communications node includes a data receiver receiving from a master node, data relating to measured carrier phases of a plurality of GPS satellites relative to a carrier phase of a first reference oscillator in the master node, and position information of the master node. The node also includes a GPS receiver and a second reference oscillator that generates a second reference signal at a preset frequency. The GPS receiver includes logic to measure carrier phases of satellite signals transmitted by the plurality of GPS satellites relative to a carrier phase of the second reference oscillator, and determine, based on the data from the master node, a difference of a phase of the second reference oscillator relative to a phase of the first reference oscillator in the master node. The communications node further includes a first time pulse signal generator coupled to the second reference oscillator. The first time pulse signal generator includes logic for aligning a carrier phase of a signal output by the first time pulse signal generator based on the determined phase difference. The first time pulse signal generator also includes logic for generating a timing pulse based on the aligned carrier phase.

According to one embodiment of the invention, the determining of the difference of the phase includes determining by each of the auxiliary nodes a position of the auxiliary node relative to the master node.

According to one embodiment of the invention, the determining of the position is based on kinematic carrier phase tracking of the satellite signals.

According to one embodiment of the invention, the plurality of nodes measure the carrier phases of the satellite signals at a preset GPS time period determined by the GPS receiver.

According to one embodiment of the invention, the transmitter in each of the plurality of nodes includes a phase lock loop frequency synthesizer driven by the reference oscillator in the node.

According to one embodiment of the invention, the GPS receiver in each of the plurality of nodes includes a phase lock loop to track the carrier phases of the satellite signals driven by the reference oscillator in the node.

According to one embodiment of the invention, the reference oscillator outputs a signal at a frequency of 10.23 MHz.

According to one embodiment of the invention, the master node sets a carrier phase of a signal output by the time pulse signal generator in the master node, to the phase of the reference oscillator in the master node. The master node generates a timing pulse based on the carrier phase of the signal output by the time pulse signal generator in the master node. The timing pulses generated by the auxiliary nodes are synchronized with the timing pulse generated by the master node.

A person of skill in the art should recognize that the embodiments of the present invention allow precise time coherency between the nodes without the need for precise (atomic clocks). Such precise time coherency between the nodes allow the nodes to operate synchronously.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Figure 1:
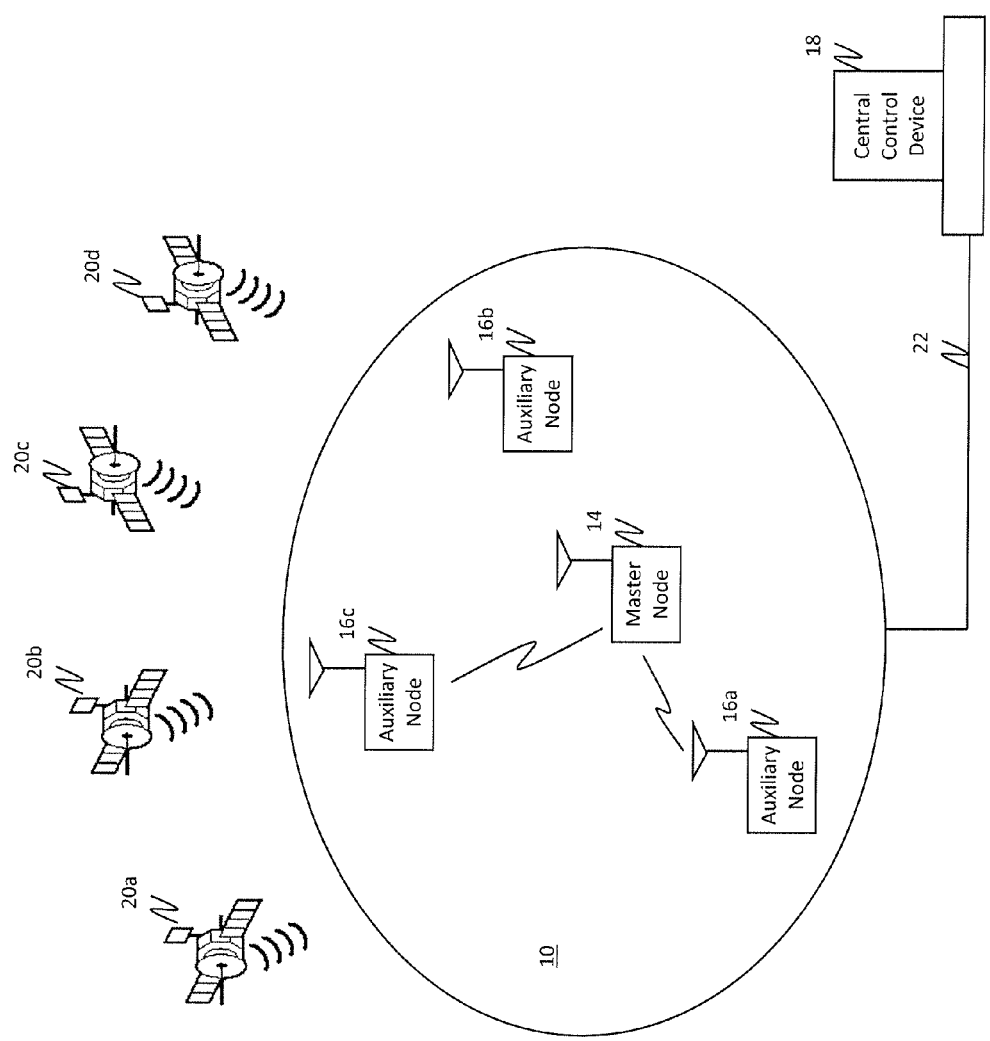
FIG. 1 is a schematic diagram of a system for GPS aided precision timing according to one embodiment of the invention.

In general terms, embodiments of the present invention are directed to a system and method for using GPS to generate picosecond accurate relative timing pulses between a distributed array of nodes. One of the nodes is designated as a master node and the remaining nodes are designated as auxiliary nodes. Each node tracks the carrier phases of satellite signals transmitted by a plurality of GPS satellites relative to the phase of the reference oscillator in the respective node. Using a data link, the master node provides the tracked satellite phase measurements along with its position information and the frequency of its reference oscillator, to all of the auxiliary nodes. Each auxiliary node determines the phase offset of its reference oscillator relative to the reference oscillator of the master node based on the transmitted data. Each auxiliary node also determines the frequency offset of its reference oscillator relative to the reference oscillator of the master node. A time pulse generator in each of the nodes is then aligned to the phase of each node's reference oscillator, which is in turn aligned to the reference oscillator of the master node. The frequency of the time pulse generator is also aligned to the frequency of the master node's reference oscillator. The aligned nodes then generate timing pulses that are synchronized among the nodes.

According to one embodiment, the distributed array of nodes may be airborne or ground vehicles, ground stations, satellites, sensing systems, and the like. The nodes are configured to take synchronized action based on synchronized timing pulses. The synchronized actions may be used to support advanced sensing requirements for bi-static and multi-static radars, electro-optic (EO) and signals intelligence (SIGINT). According to one embodiment, GPS satellite kinematic carrier phase tracking (KCPT) and position measurements that are shared amongst the nodes help provide the precise time coherency.

Conventional wisdom indicates that the use of GPS to implement precise time coherency is not feasible. This is because the best timing accuracy available using classical GPS receiver techniques is in the order of a few nanoseconds due to the fact that timing in a typical GPS receiver is derived from count-down logic that is driven by a high frequency clock derived from the receiver's reference oscillator. In addition, the time solution associated with the GPS navigation solution is in the order of 10 to 20 nanoseconds. However, the timing accuracy that is desired, according to one embodiment, to synchronize the timing pulses, is in the order of few picoseconds. Picosecond accuracy is currently not provided by typical GPS receivers.

Embodiments of the present invention eliminate the need to derive accurate GPS time at each node. Instead, embodiments of the present invention make use of relative KCPT measurements between nodes and phase of each node's reference oscillator relative to the master node to align the phases of the GPS receivers' reference oscillators.

In this regard, one of the nodes in the distributed array is designated as a master node, and the remaining nodes of the array are designated as auxiliary nodes. Each auxiliary node determines a GPS position relative to the master node. According to one embodiment, KCPT methodology is used to determine the relative position of the auxiliary node to within a few millimeters of the master node. Such position accuracy is desired for synchronizing the phases of the reference oscillators.

As a person of skill in the art will understand, KCPT is a precision navigation technique that uses precision GPS satellite carrier phase measurements to determine a navigation position. The KCPT algorithm measures the carrier phases of all GPS satellites for identifying a position of a GPS receiver within inches in a volume space. Each position in the volume space has a specific combination of carrier phases which are pre-calculated for the position. A measured set of carrier phases are compared against the pre-calculated combinations, and the location of a matched combination of carrier phases is deemed to be the location of the GPS receiver. Further details on the KCPT algorithm is provided by Lien Dai et al., "Innovative Algorithms to Improve Long Range RTK Reliability and Availability," ION NTM 2007, the content of which is incorporated herein by reference.

Based on the relative position information and the satellite carrier phase measurements, the phase of each reference oscillator in an auxiliary node is "aligned" with the phase of the reference oscillator in a master node. The term "align" as used herein does not require that the auxiliary nodes physically adjust the phases of their reference oscillators to match the phase of the master node's reference oscillator, but simply requires each node to have knowledge of a phase offset of its reference oscillator in relation to the master node's reference oscillator.

According to one embodiment of the invention, the "aligning" of an auxiliary node's reference oscillator is within 16 millidegrees of the master node's reference oscillator. A reference oscillator accuracy of 16 millidegrees translates to only 2.5 degrees of phase error at 1.57542 GHz.

To accomplish accurate phase alignment of the reference oscillators, the following observation is noted. The receivers use a phase lock loop (PLL or Costas loop) to track the GPS satellite carrier signals (reconstructed carrier after PN correlation). The phase of the NCO (digital number controlled oscillator) used to implement the PLL relates directly to the phase of the reference oscillator since the NCO is synchronously driven by the reference oscillator. Although this observation has no significance in the typical GPS receiver, it is one of the key requirements in implementing the GPS aided precision timing according to the embodiments of the present invention.

According to one embodiment, all nodes make their satellite tracking PLL phase measurements at the same time (e.g. at the GPS 1 second epoch). The master node conveys the phase measurements of the satellites (PLL phases) in relation to the phase of its reference oscillator, to all the auxiliary nodes, via a data link coupled to the nodes. The master also conveys its current GPS position, heading, and velocity. Based on the received information, each auxiliary node can compare its satellite tracking PLL phase measurements with the PLL phases of the master node to determine the phase of its reference oscillator relative to the master node's reference oscillator. Even if not all nodes make their satellite tracking PLL phase measurements at the same time due to a timing error, such timing error is negligible for purposes of aligning the carrier phases of the reference oscillators.

For example, if the satellite phase measurement by a first node is as much as 100 nanoseconds before or after the satellite phase measurement by a second node, the 100 nanosecond error translates to a phase measurement error only around 0.27 degrees (0.15 mm). This is because mixing operations in the GPS receiver translates the high frequency L-band carrier signals (e.g. 1.5 GHz) from the satellites to a low frequency baseband (e.g. 10.23 MHz) leaving only low frequency Doppler offsets as an error term due to user and satellite motion. A phase error (e.g. a 1 degree error) at the high frequency however still translates to be the same phase error (e.g. a 1 degree error) at the low frequency level. The same phase error at the low frequency, however, is negligible because the error is expanded in time. Thus, for a 100 nanosecond measurement time error between nodes and a 1500 meter/second velocity offset (node-to-satellite and vehicle motion), the effective phase measurement error is only ≈0.27 degrees (0.15 mm).

Each of the auxiliary nodes use the knowledge of its position relative to the master node and the phase offset between its reference oscillator and the reference oscillator of the master node to align the phase of its time pulse signal generator to the phase of the master node's reference oscillator. The frequency of the time pulse signal generator is also aligned to the frequency of the master node's reference oscillator.

FIG. 1 is a schematic diagram of a system for GPS aided precision timing according to one embodiment of the invention. The system includes a distributed array of airborne and/or ground communications nodes 10 configured to output a timing pulse in a synchronized manner (e.g. every GPS 1 second epoch). The nodes 14, 16 may be land or airborne vehicles, tethered balloons, man-portable ground stations, satellites, sensors, or other nodes with communication and navigation hardware and software as will be apparent to person of skill in the art.

According to one embodiment, the nodes are equipped with a communication and navigation processor, memory, hardware, and software for achieving the various functionalites described herein. For example, the nodes are configured to collect satellite carrier phase measurements from one or more GPS satellites 20a-20d (collectively referred to as 20), transmit/receive data signals to/from nodes or a central control device 18, and generate synchronized timing pulses on a periodic basis.

The nodes are also coupled to the central control device 18 over a communications link 22. The communications link 22 may be an infrared data port, a wireless communications link, global communications link such as the Internet, or any other communications medium known in the art. The central control device 18 is a computer equipped with a processor and memory storing computer program instructions for designating the nodes as master or auxiliary nodes, transmitting commands to the nodes as to the rate of output of the timing pulses, and/or the like.

According to one embodiment of the invention, one of the nodes of the array 10 operates as a master node 14 in response to data communicated from the central device 18, while the remaining nodes operate as auxiliary nodes 16a, 16b, 16c (collectively referred to as 16). Although any of the nodes may be selected as the master node, it is desirable to select the node in the middle of the swarm of nodes as the master. A person of skill in the art will recognize that the designating of the master and auxiliary nodes may also be automatic or based on any other mechanism as will be understood by a person of skill in the art.

The master node 14 functions as the reference to which all of the auxiliary nodes 16 will phase align their time pulse signal generators. As the reference, the master node 14 transmits a reference node data set at, for example, a 1 Hz rate, which may be conveniently tied, for example, to a 1 second GPS epoch used by the nodes to measure the satellite phases.

According to one embodiment, the reference node data set includes position, velocity, and heading of the master node 14, frequency of the master node's reference oscillator, and phases of the tracked GPS satellites 20 as measured by the master node in relation to the phase of its reference oscillator.

Based on the received reference node data set, the auxiliary nodes 16 execute the KCPT algorithm to determine their position to within millimeters of the master node. Based on the knowledge of the position of each auxiliary node in relation to the master node, and the knowledge of the measured phases of its tracked satellites in relation to the measured phases of the tracked satellites by the master node, each auxiliary node 16 can establish the phase of its reference oscillator to within 16 millidegrees phase error of the master node's reference oscillator. This provides the auxiliary nodes 16 a common frame of reference relative to the master node 14 to align the phase and frequency of their time pulse signal generators. In other words, because each auxiliary node knows its position and reference oscillator phase and frequency relative to the master node's 14, each auxiliary node can compute the frequency and phase alignment required for the time pulse signal generator to generate a timing pulse that is synchronized to the master node.

Figure 2:
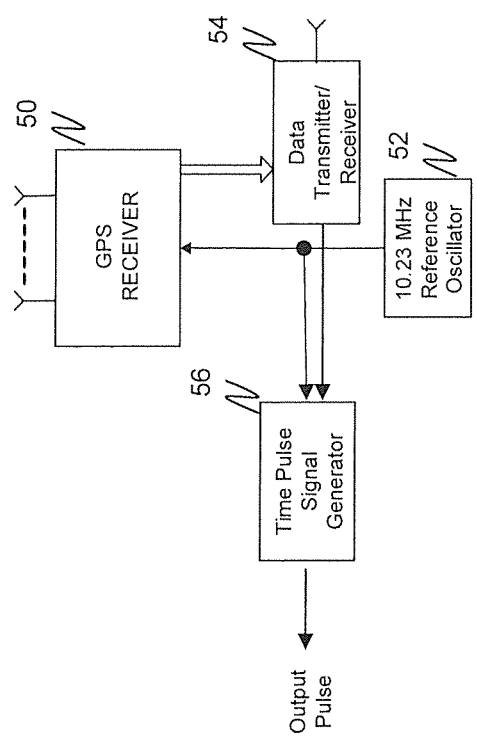
FIG. 2 is a schematic block diagram of a node of a distributed array according to one embodiment of the invention.

FIG. 2 is a schematic block diagram of a node 14 or 16 of the array according to one embodiment of the invention. The node includes a GPS receiver 50 with logic for measuring the carrier phases of each of the satellites 20 at preset time periods (e.g. 1 second epoch) and determining a current position of the node via the KCPT algorithm. KCPT is preferred as it allows the auxiliary nodes to determine their position within millimeters of the master node. However, a person of skill in the art will recognize that any other GPS positioning algorithm may be used in lieu of the KCPT algorithm as long as it provides a similar type of position accuracy.

The GPS receiver 50 is coupled to a reference oscillator 52 and data transmitter/receiver 54. Each node further includes a time pulse generator 56 for generating synchronized timing pulses at preset times.

According to one embodiment, the reference oscillator generates reference signals at a frequency of 10.23 MHz. The reference signals that are generated may be sine waves or square waves. The reference oscillator drives both the local NCO in the GPS receiver as well as the time pulse signal generator 56. A person of skill in the art will recognize that other frequencies other than 10.23 MHz may be used in alternative embodiments. Furthermore, although the reference oscillator 52 is illustrated to be separate from the GPS receiver 50, a person of skill in the art will recognize that the reference oscillator may be included as part of the GPS receiver 50.

Depending on the role of each node (i.e. master or auxiliary), the data transmitter/receiver 54 is used to transmit or receive a master node's measured satellite phases, its position, heading, and velocity information, as well as the frequency of its reference oscillator. The heading and velocity information may be calculated via GPS or by an inertial navigation system (which may use the GPS navigation data) and/or gyroscopes which may be separate or part of the GPS receiver. The data transmitter/receiver 54 may also be used to receive data transmitted by the central control device 18.

Figure 3:
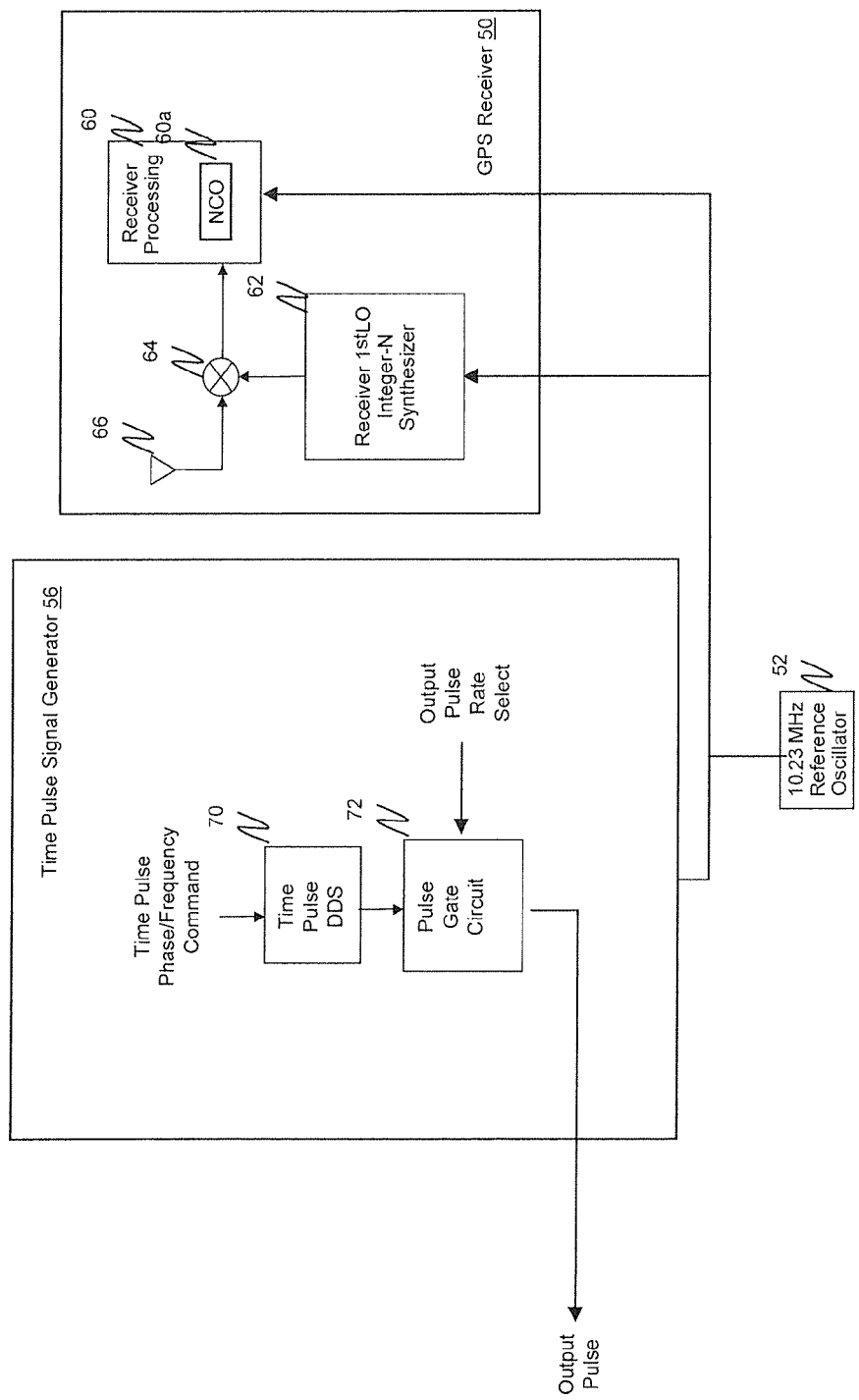
FIG. 3 is a more detailed block diagram of a GPS receiver and time pulse signal generator according to one embodiment of the invention.

FIG. 3 is a more detailed block diagram of the GPS receiver 50 and time pulse signal generator 56 according to one embodiment of the invention. The GPS receiver 50 includes an L band GPS receiver antenna 66 receiving, for example, an L1 band signal of 1.57542 GHz from the tracked satellites 20. The GPS receiver 50 further includes an integer N-type phase lock loop synthesizer 62. The synthesizer 62 and the GPS antenna 66 are coupled to a mixer 64 which allows the high frequency L1 band GPS signal to be mixed down to a lower frequency baseband signal. The lower frequency baseband signal is applied to a receiver processing logic 60 which includes an NCO 60a and a PLL. NCO 60a is used for PLL (Costas) tracking of the down-converted GPS carrier signal. The receiver processing logic 60 further includes PN correlation and PN code tracking logic which allows the reconstructing of the satellite carrier signal. The PLL, using the NCO 60a, typically provides a tracking error of 2.5 degrees RMS (1.5 mm) which equates to a 2.5 degrees RMS (1.5 mm) tracking error at the GPS L1 frequency (i.e., 1.57542 GHz). Typically, a 2.5 degree RMS tracking error is achieved in a GPS receiver for a nominal satellite signal C/No level of 40 db-Hz. The 2.5 degrees RMS phase error of the NCO 60a equates to about 16 millidegrees of phase knowledge of the 10.23 MHz reference oscillator 52 since the NCO 60a is synchronously clocked by the reference oscillator 52. This relationship is a consequence of the 154:1 ratio of the GPS satellite carrier frequency to the frequency of the GPS receiver's reference oscillator 52. Therefore, all auxiliary nodes can determine the phase of their reference oscillator 52 within 16 millidegrees of the master node's reference oscillator, despite the 2.5 degree phase error at the higher L1 frequency.

The GPS receiver includes receiver processing logic 60 for performing various navigation processing functions. For example, the processing logic 60 may be configured to output the measured phases of the tracked satellites 20 relative to the phase of its reference oscillator 52. The receiver processing logic may also be configured to execute the KCPT algorithm to identify a geographic position of the node relative to the master node, as well as determine the node's velocity, heading, and the like.

According to one embodiment of the invention, the time pulse signal generator 56 includes a time pulse DDS (direct digital synthesizer) 70 and a pulse gate circuit 72. According to one embodiment, the time pulse DDS is driven by the reference oscillator 52. The time pulse DDS 70 receives a command for frequency and phase alignment from software run by the node. In this regard, each node includes a memory storing computer program instructions that are executed by a processor in order to implement various functionalities of the node. Some of the computer program instructions, such as, for example, instructions for aligning the frequency and phase of the time pulse DDS, may be executed by the processor during power-up of the node.

In response to the command to the time pulse signal generator to align its frequency and the phase, the time pulse DDS 70 sets its frequency and phase to match the frequency and phase of its reference oscillator 52. The phase of the DDS may be aligned via, for example, a phase lock loop. Unlike the "alignment" of the reference oscillator, this results in physical alignment of the phase of the time pulse DDS. In this regard, if the node is an auxiliary node, the frequency and phase offset between the auxiliary node's reference oscillator and the master node's reference oscillator is taken into account to align the frequency and carrier phase of the time pulse DDS to the frequency and phase of the master node's reference oscillator. For example, where the signals generated by the time pulse DDS and reference oscillators are square wave signals, the rising edge of the signal generated by the time pulse DDS is aligned with the rising edge of the signal generated by the master node's reference oscillator.

After DDS frequency and phase alignment is achieved, the pulse gate circuit is invoked for generating a timing pulse on a periodic basis. The pulse gate circuit includes a switch and other circuitry as will be understood by a person of skill in the art for generating a pulse. The pulse gate circuit is provided with a command identifying a rate in which the timing pulses are to be generated. For example, the command may be to generate a timing pulse every GPS 1 second epoch time. The generating of the timing pulse at the desired rate may be possible, for example, due to the knowledge of the time in between rising edges of the square wave signal output by the time pulse DDS.

Figure 4:
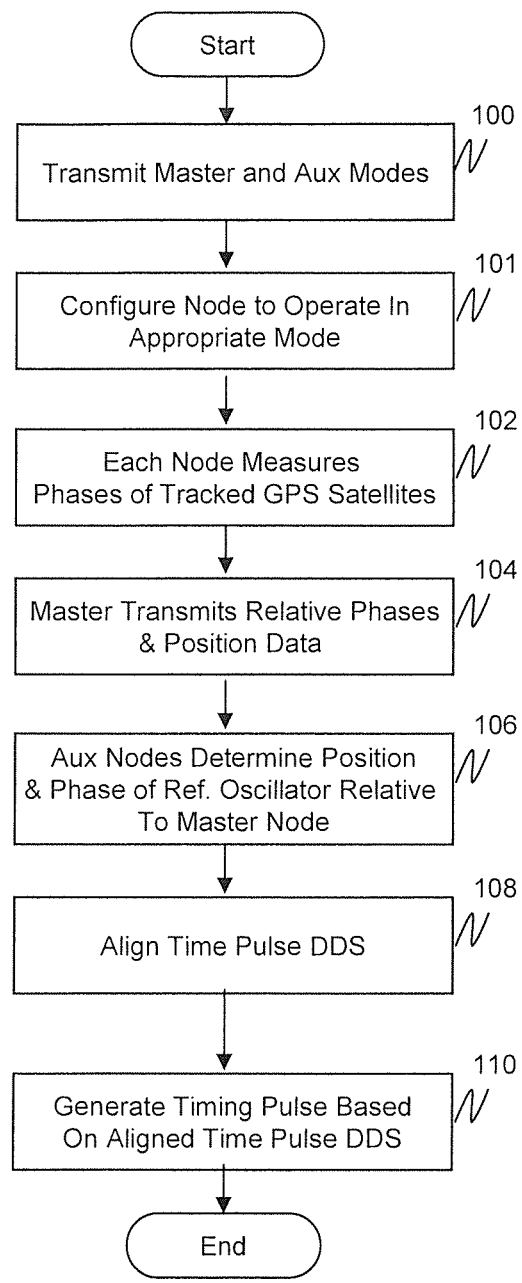
FIG. 4 is a flow diagram of a process for GPS aided precision timing according to one embodiment of the invention.

FIG. 4 is a flow diagram of a process for GPS aided precision timing according to one embodiment of the invention. At least part of the process may be described in terms of a software routine executed by respective processors in the executing device's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

In step 100, the central control device 18 transmits to all the nodes of the array 10, the device mode (i.e. master or auxiliary) selected for the node. In this regard, the memory of the central control device 18 includes computer program instructions that are configured to identify the nodes in the array 10, designate one of the nodes as the master node, and transmit mode identifier data over the data link 22 indicating that the node is a master node. According to one embodiment, a node that is located in the middle of the swarm of nodes is selected as the master node. Alternatively, the master node may be randomly selected. The program instructions are further configured to transmit mode identifier data to the remaining nodes indicating each of their status as an auxiliary node.

The central control device 18 also transmits a command to each node to generate a timing pulse at a particular rate. The command may be transmitted together with, or separately from, the mode identifier data. For example, the command may be transmitted in response to a user input indicating that the nodes are to put out a strobing pulse to strobe the sensors once a second.

In step 101, the data receiver 54 in each node receives data transmitted by the central control device including the mode identifier data and a command to generate a timing pulse. Computer program instructions stored in the node's memory configures the node to operate in the mode indicated by the mode identifier data. If a node is identified as the master node, then the computer program instructions configure the node to transmit (on its data transmitter 54), for example, once per second, the phase measurements of the tracked GPS satellites (PLL phases) in relation to its reference oscillator, its current GPS position, heading, and velocity, and the frequency of its reference oscillator.

If a node is identified as an auxiliary node, then the computer program instructions configure the node to receive, using data receiver 54, the data transmissions from the master node. The computer program instructions further configure the node to execute the KCPT algorithm to determine its position relative to the master node and, using PLL measurements of the tracked GPS satellites, to determine the phase of its reference oscillator relative to the master nodes reference oscillator.

In step 102, each node of the array 10 measures the carrier phases of the tracked GPS satellites 20 in relation to their own reference oscillator 52. In this regard, each GPS receiver 50 measures at a preset time period (e.g. a 1 second epoch time determined by a GPS time pulse), the carrier phases of the satellites 20 and translates the high frequency carrier phases to low frequency phase observations relative to the phase of its reference oscillator.

In step 104, the master node conveys the phase of its reference oscillator to all the auxiliary nodes by transmitting the PLL phase of the tracked satellites relative to the phase of the reference oscillator. The master node also transmits to the auxiliary nodes its GPS position, velocity, and heading information, as well as the frequency of its reference oscillator.

In step 106, each of the auxiliary nodes "align" the phase of its reference oscillator to the phase of the master node's reference oscillator. In this regard, each auxiliary node invokes its receiver processing logic 60 to execute the KCPT algorithm for determining the geographic position of the node relative to the master node based on the data provided by the master node. Based on this relative position information, the GPS receiver processing logic 60 back-calculates the phases of its tracked satellites to determine the phases that the node would see if the node were at the master node's location. Any difference in the back-calculated relative phases compared to the relative phases transmitted by the master node indicates that the auxiliary's reference oscillator is offset from the master node's reference oscillator by the detected difference.

In step 108, the nodes align the time pulse signal generator 56 to match the phase and frequency of its reference oscillator 52. This may be done in response to a command generated upon configuring of the node as a master node or an auxiliary node. If the node is configured as an auxiliary node, the auxiliary node identifies the frequency of its reference oscillator, identifies any difference of the identified frequency when compared to the frequency of the master node's reference oscillator, determines what the aligned frequency would be, and sets the frequency of the time pulse DDS 70 to the determined aligned frequency. In addition, the auxiliary node adjusts the phase of the time pulse DDS 70 to the "aligned" phase of is reference oscillator.

If the node is a master node, the frequency and phase of the time pulse DDS is set to the frequency and phase of its reference oscillator. In this manner, the frequency and carrier phases of the time pulse DDS of all the auxiliary nodes are aligned to the frequency and carrier phase of the master node's time pulse DDS.

In step 110, the pulse gate circuit is invoked to generate timing pulses at a particular rate. The particular rate in which the timing pulses are output is controlled by a pulse rate select command provided to the pulse gate circuit. Because the timing between the rising edges of the square wave signal output by the time pulse DDS is known, a determination can be made as to the rising edge that corresponds to the time when a timing pulse should be generated. When such a rising edge is detected, the pulse gate circuit outputs a pulse. Since the square wave signals output by the time pulse DDS in all the nodes rise and fall in a synchronized manner, the timing pulses generated by all the nodes are also synchronized among the nodes.

Figure 8:
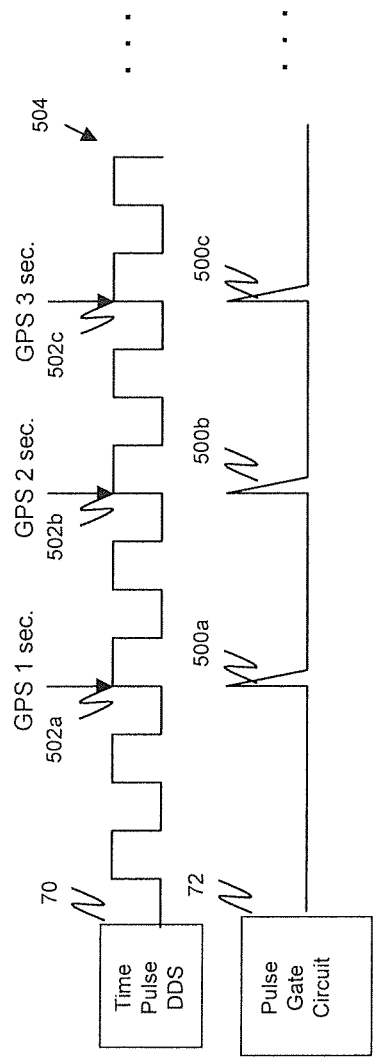
FIG. 8 is a schematic diagram of a square wave signal output by the time pulse DDS and a timing pulse generated by the pulse gate circuit according to one embodiment of the invention.

FIG. 8 is a schematic diagram of a square wave signal 504 output by the time pulse DDS 70 and timing pulses generated by the pulse gate circuit 72 according to one embodiment of the invention. In the illustrated embodiment, the pulse gate circuit 72 generates a pulse 500a-500c every GPS 1 second epoch. In this regard, the pulse gate circuit 72 monitors the rising edges of the square wave signal and upon detecting a rising edge that corresponds to the appropriate GPS time, it generates a pulse when the rising edge occurs.

Figures 5A, 5B:
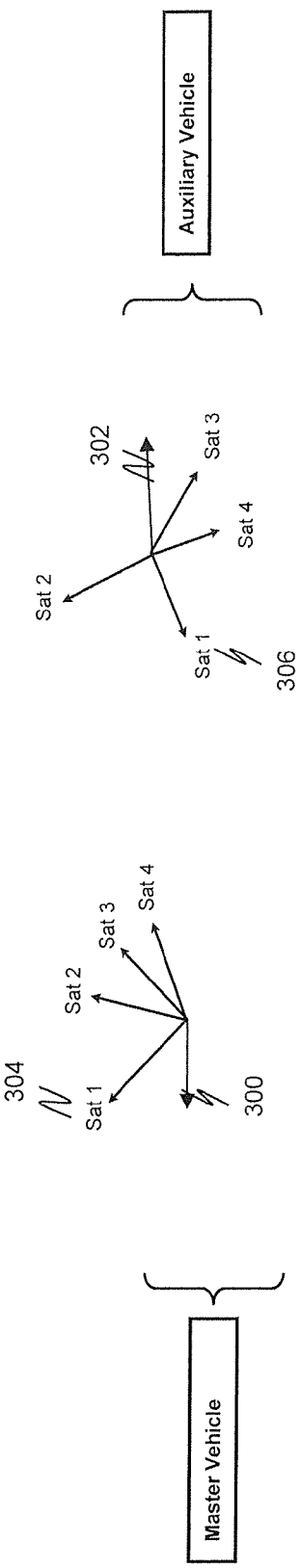
FIGS. 5A-5B are schematic diagrams of the relative carrier phases measured by a master node and an auxiliary node according to one example.

FIGS. 5A-5B are schematic diagrams of the relative carrier phases measured by the master node and an auxiliary node at a one-second measurement time according to one example. In the illustrated example, the master node observes particular phases 304 for its tracked satellites in reference to the phase 300 that is observed for its reference oscillator. The auxiliary node also observes particular phases 306 for its tracked satellites in reference to the phase 302 observed for it reference oscillator. Due to GPS timing error, the carrier phase measurements at the preset time period are not perfectly synchronized, and in fact, the measurements may be offset as much as 100 nanoseconds, although typically the time error is on the order of 10 to 20 nanoseconds. Thus, if the phases of the time pulse DDS were to be synchronized based on GPS time, it would produce unacceptably high phase differences. However, a GPS timing error of even 100 nanoseconds has a negligible impact when it comes to GPS satellite and reference oscillator phase measurements.

Figure 6:
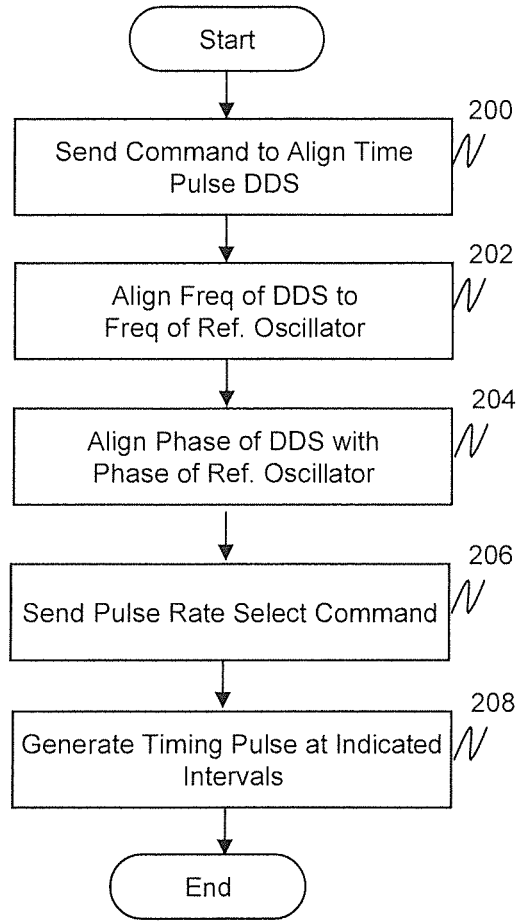
FIG. 6 is a more detailed flow diagram of aligning a time pulse signal generator and generating a timing pulse based on the aligned time pulse signal generator according to one embodiment of the invention.

FIG. 6 is a more detailed flow diagram of steps 108 and 110 of FIG. 4 executed by the time pulse signal generator according to one embodiment of the invention.

In step 200, software running in each of the nodes transmits a command for frequency and phase alignment. In response to the command, the time pulse DDS 70, in step 202, sets its frequency to the frequency of its reference oscillator 52, "aligned" as necessary to match the frequency of the master node's reference oscillator if the node is an auxiliary node.

In step 204, the time pulse DDS also aligns its carrier phase to the phase of its reference oscillator. According to one embodiment of the invention, the time pulse DDS includes a phase lock loop for performing this alignment. In this regard, the phase of the time pulse DDS 70 is aligned to the phase of its reference oscillator, which in turn is "aligned" as necessary to match the phase of the master node's reference oscillator if the node is an auxiliary node.

In step 206, the software running on the node further sends a pulse rate select command to the pulse gate circuit 72. The command may be, for example, to generate a pulse every GPS 1 second.

In step 208, the pulse gate circuit calculates an elapsed time based on the number of rising edges of the time pulse DDS signal detected since a last pulse was generated, and generates a pulse at a rising edge that corresponds to a desired time interval between pulses. There is no ambiguity in the output phase of the time pulse DDS since the rising edge of the output signal is aligned with the rising edge of its reference oscillator.

Figure 7B:
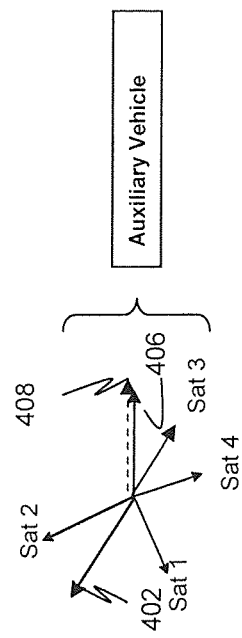
FIGS. 7A-7B are schematic block diagrams of calibration of a time pulse DDS in a master node and a particular auxiliary node according to one example.
Figure 7A:
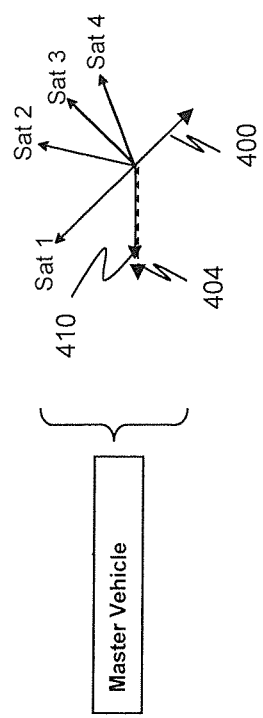

FIGS. 7A-7B are schematic block diagrams of calibration of the time pulse DDS 70 in the master node and a particular auxiliary node according to one example. The DDS phase 400 of the master vehicle is aligned to the phase 404 of its reference oscillator to output an aligned phase 410. Similarly, the DDS phase 402 of the auxiliary vehicle is aligned to the phase 406 of its reference oscillator to output an aligned phase 408. Specifically, the phase 406 is "computationally adjusted" to match that of the master nodes reference oscillator.

Embodiments of the present invention provide picosecond relative timing accuracy between nodes that does not require the use of precise atomic clocks. The picosecond relative timing pulses can be used for network synchronization, bi-static and multi-static sensors, and synthesized array sensors as will be apparent to a person of skill in the art. For example, sensors incorporating embodiments of the present invention may allow such sensors to be operated synchronously with picosecond relative timing accuracy.

It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for generating synchronized timing pulses from a plurality of nodes, wherein one of the plurality of nodes is designated as a master node and remaining ones of the plurality of nodes are designated as auxiliary nodes, wherein each of the plurality of nodes includes a GPS receiver, reference oscillator, and time pulse signal generator, the method comprising:
 measuring via the GPS receiver in each of the plurality of nodes, carrier phases of satellite signals transmitted by a plurality of GPS satellites relative to a carrier phase of the reference oscillator in the respective node;
 providing by the master node to the auxiliary nodes, data relating to the measured carrier phases of the plurality of GPS satellites and position information of the master node;
 setting by the master node, a carrier phase of a signal output by the time pulse signal generator in the master node, to the phase of the reference oscillator in the master node;
 generating a timing pulse by the master node based on the carrier phase of the signal output by the time pulse signal generator in the master node;
 determining by each of the auxiliary nodes based on the data from the master node, a difference of the phase of the reference oscillator of the auxiliary node relative to the phase of the reference oscillator in the master node;
 aligning, for each of the auxiliary nodes, a carrier phase of a signal output by the time pulse signal generator in the auxiliary node based on the determined phase difference;
 generating a timing pulse by each of the auxiliary nodes based on the aligned carrier phase, wherein the timing pulses generated by the auxiliary nodes are synchronized with the timing pulse generated by the master node.

2. The method of claim 1, wherein the determining of the difference of the phase includes determining by each of the auxiliary nodes a position of the auxiliary node relative to the master node.

3. The method of claim 2, wherein the determining of the position is based on kinematic carrier phase tracking of the satellite signals.

4. The method of claim 1, wherein the plurality of nodes measure the carrier phases of the satellite signals at a preset GPS time period determined by the GPS receiver.

5. The method of claim 1, wherein the transmitter in each of the plurality of nodes includes a phase lock loop frequency synthesizer driven by the reference oscillator in the node.

6. The method of claim 1, wherein the GPS receiver in each of the plurality of nodes includes a phase lock loop to track the carrier phases of the satellite signals driven by the reference oscillator in the node.

7. The method of claim 1, wherein each reference oscillator outputs a signal at a frequency of 10.23 MHz.

8. A communications node for generating synchronized timing pulses comprising:
 a data receiver for receiving from a master node, data relating to measured carrier phases of a plurality of GPS satellites relative to a carrier phase of a first reference oscillator in the master node, and position information of the master node;
 a second reference oscillator generating a second reference signal at a preset frequency;
 a GPS receiver coupled to the data receiver and the second reference oscillator, the GPS receiver including logic for:
 measuring carrier phases of satellite signals transmitted by the plurality of GPS satellites relative to a carrier phase of the second reference oscillator; and
 determining, based on the data from the master node, a difference of a phase of the second reference oscillator relative to a phase of the first reference oscillator in the master node;
 a first time pulse signal generator coupled to the second reference oscillator, the first time pulse signal generator including logic for aligning a carrier phase of a signal output by the first time pulse signal generator based on the determined phase difference, and further including logic for generating a timing pulse based on the aligned carrier phase,
 wherein, the master node includes a second time pulse signal generator configured to set a carrier phase of a signal output by the second time pulse signal generator, to the phase of the first reference oscillator, and further configured to generate a timing pulse based on the carrier phase of the signal output by the second time pulse signal generator, wherein the timing pulse generated by the first time pulse signal generator is synchronized with the timing pulse generated by the second time pulse signal generator.

9. The communications node of claim 8, wherein the logic for determining the difference of the phase includes logic for determining a position of the node relative to the master node.

10. The communications node of claim 9, wherein the logic for determining the position is based on kinematic carrier phase tracking of the satellite signals.

11. The communications node of claim 8, wherein the GPS receiver is configured to measure the carrier phases of the satellite signals at a preset UPS time period.

12. The communications node of claim 8, wherein the transmitter includes a phase lock loop frequency synthesizer driven by the first reference oscillator.

13. The communications node of claim 8, wherein the GPS receiver includes a phase lock loop to track the carrier phases of the satellite signals driven by the second reference oscillator.

14. The communications node of claim 8, wherein the first and second reference oscillators each outputs a signal at a frequency of 10.23 MHz.

* * * * *

UNITED STATES PATENT AND TRADEMARK OFFICE
CERTIFICATE OF CORRECTION

| | | |
|---|---|---|
| PATENT NO. | : 8,724,760 B2 | Page 1 of 1 |
| APPLICATION NO. | : 13/458543 | |
| DATED | : May 13, 2014 | |
| INVENTOR(S) | : Grobert et al. | |

It is certified that error appears in the above-identified patent and that said Letters Patent is hereby corrected as shown below:

In the Specification

Column 1, Line 3-4 should read

Government License Rights

This invention was made with Government support under contract N66001-10-C-2005. The Government has certain rights in the invention.

Signed and Sealed this
Fifth Day of August, 2014

Michelle K. Lee
*Deputy Director of the United States Patent and Trademark Office*